(12) United States Patent
Kumar et al.

(10) Patent No.: US 6,535,980 B1
(45) Date of Patent: Mar. 18, 2003

(54) KEYLESS ENCRYPTION OF MESSAGES USING CHALLENGE RESPONSE

(75) Inventors: Suresh Kumar, Bellevue, WA (US); Vijay Kumar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/337,719

(22) Filed: Jun. 21, 1999

(51) Int. Cl.[7] .................................................. H04L 9/00
(52) U.S. Cl. ....................................... 713/168; 713/278
(58) Field of Search ......................... 380/256, 28, 278; 713/168, 170, 171, 181, 183; 705/75

(56) References Cited

U.S. PATENT DOCUMENTS 5,293,576 A * 3/1994 Mihm et al. ................ 380/273

* cited by examiner

*Primary Examiner*—Gilberto Barron
*Assistant Examiner*—Grigory Gurshman
(74) *Attorney, Agent, or Firm*—Whitham, Curtis & Christofferson, P.C.; T. Rao Coca

(57) ABSTRACT

A method of keyless encryption of messages allows secure transmission of data where data security is not available for some technical or legal reason. The method of data transfer uses a challenge response in which a correct response to a challenge is used to transmit the value "1", while a deliberately false response is made to transmit the value "0". Any message can be transmitted as a binary string using successive applications of this method.

10 Claims, 3 Drawing Sheets

KEYLESS ENCRYPTION OF MESSAGES USING CHALLENGE RESPONSE

BACKGROUND OF THE INVENTION

1. Field of the Invention

The present invention generally relates to secure electronic data transfer and, more particularly, to a method of secure electronic transfer of data whose security does not rely on encryption with keys.

2. Background Description

A cryptosystem is an apparatus used to facilitate the transfer of a confidential message (such as a password or credit card number) between two parties via an insecure communication channel that allows the message to be snooped (intercepted and worked on). Traditional approaches to constructing such an apparatus involve providing the construction of an encryption scheme (at the sender's end) that uses some encryption keys to transform the message into a coded or ciphertext, and a decryption scheme (at the receiver's end) to recover the original message from the ciphertext again using some decryption keys. Note that the decryption scheme must be the inverse of the encryption scheme to recover the message correctly. By coding the message, a party eavesdropping on the unsecure channel will not be able to understand the message, even though he will be able to listen to it. All cryptosystems have three potential parties—the sender of the message, the receiver for whom it is intended, and the eavesdropper.

Existing methods for cryptosystems can be broadly divided into two categories—message encryption and authentication. A message encryption system is used when the sender wishes to transmit a message that the receiver does not know the message in advance. In an authentication system, on the other hand, the receiver typically knows the correct message in advance, and the message is used as a password to authenticate the credential of the sender. Note that message encryption systems can also be used for authentication purposes, and are in fact so used in many places.

Cryptosystems generally use a key to encode the message. The key is a number (or string) used by the encryption method in mapping the message string to a coded string. The same key or another key is then used by receiver to decode or unlock the message. Key based message cryptosystems can be broadly classified as private key or public key systems.

A private-key cryptosystem is one where the encryption and decryption keys are private and agreed upon in advance. For an example of such a system, see U.S. Pat. No. 4,424,414 to Hellman and Pohlig. In this system, the keys must be kept secret, since the same key is generally used both to encrypt and decrypt the message.

A public-key cryptosystem overcomes the shortcoming of having previously agreed upon secret keys between the communicating parties. In this scheme, each member publishes one or more public keys announced publicly and associated with this member. Anyone wishing to send a message to this member can then encode the message using a procedure that employs this member's announced public key. The central idea is that a message so encoded can be decoded efficiently only by the member itself who has some additional private information, while a snooper trying to decode this message is up against a computationally intractable task. Some of the first methods to implement such a cryptosystem are described in U.S. Pat. No. 4,405,829 to Rivest, Shamir and Adleman, for "Cryptograpic communications system and method", and U.S. Pat. No. 4,200,770 to Hellman, Diffie and Merkle, for "Cryptographic apparatus and method". See also U.S. Pat. No. 4,218,582 to Hellman and Merkle, for "Public key cryptographic apparatus and method". Public key cryptosystems can be broken even if a single message is encrypted and sent, given enough time. For this reason, strong encryption demands the use of long keys.

In contrast to public/private key systems, authentication systems can be built using a "challenge response" scheme. See, for example, U.S. Pat. No. 4,723,284 to Munck and Chapin, for "Authentication system". After the receiver (authenticator) and the sender (user) have contractually agreed upon a set of challenge-response pairs, whenever this user wants to gain access, the authenticator poses a challenge randomly chosen from among the set of agreed upon pairs. The user authenticates himself or herself by looking through the predetermined list to pick out the appropriate response and providing it to the system. On verifying the correctness of this response, the system provides access to the user. The table of predetermined challenge-response pairs may be replaced by computational procedures that, using a much shorter private key provided to both the system and the user, generates a challenge at the system side given the identity of the user, and given such a challenge and the local private key, generates the appropriate response, which in turn can be verified by the system. See, for example, U.S. Pat. No. 4,935,962 to Austin, for "Method and system for authentication", and U.S. Pat. No. 4,999,258 to Davies, for "Apparatus and methods for granting access to computers". The method disclosed in U.S. Pat. No. 5,406,623 to Beller and Jacobi, for "Public key authentication and key agreement for low-cost terminals", is particularly suited to a system and user with asymmetric computational resources. Challenge response systems have the advantage over Public Key encryption systems that a single exchange is insufficient to break the system. Even if the eavesdropper listened to one challenge and response, the response will be useless if he tries to access the system, since a new challenge will be thrown the next time around. However, the traditional challenge response system is not suited for sending an arbitrary message but is used to achieve authentication.

Strong encryption, such as RSA (for Rivest, Shamir and Adleman) encryption using 128-bit keys, is a good way of secure electronic data transfer. However, for various reasons, the option of using strong encryption is not always available. For instance, laws of many nations proscribe the use of strong encryption in communications that cross national boundaries.

SUMMARY OF THE INVENTION

It is therefore an object of the present invention to provide a keyless encryption of messages.

According to the invention, there is provided a secure method of data transfer using a challenge response in which a correct response to a challenge is used to transmit the value "1", while a deliberately false response is made to transmit the value "0". Any message can be transmitted as a binary string using successive applications of this method.

This invention extends the challenge-response system from a purely authentication system to that of a message encryption system suitable for sending arbitrary message in a secret fashion. In the new method, the sender and receiver agree on a set of challenge-response pairs as usual. When the sender wishes to send an arbitrary message, the sender converts the message into binary format (using a standard convention, e.g. ASCII (American Standard Code for Information Interchange) if the message is a string). Then, each bit of the message is sent as a response. For every bit, the receiver issues a challenge. If the bit that the sender has to transmit is a one, the sender sends the correct response. If the bit is a zero, he sends a randomly chosen wrong response to indicate that the bit is a zero (the function of correct and incorrect responses could be reversed, in a pre-agreed manner). The conversation ends when the entire message is transmitted this way, either by sending the length of the message in the beginning, pre-agreeing on the length of the message, or by sending a suitable sequence of bits to indicate termination. For simplicity, we will restrict our description to the case where k, the number of bits in the message is fixed. It is easy to extend this system to one that can transmit an arbitrarily large number of bits, for example, by either sending the number of bits contained in the message up front or by sending a previously agreed upon termination bit pattern at the end of a message. In many applications (e.g., the transmission of credit card numbers), the number of bits to be transmitted may be fixed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
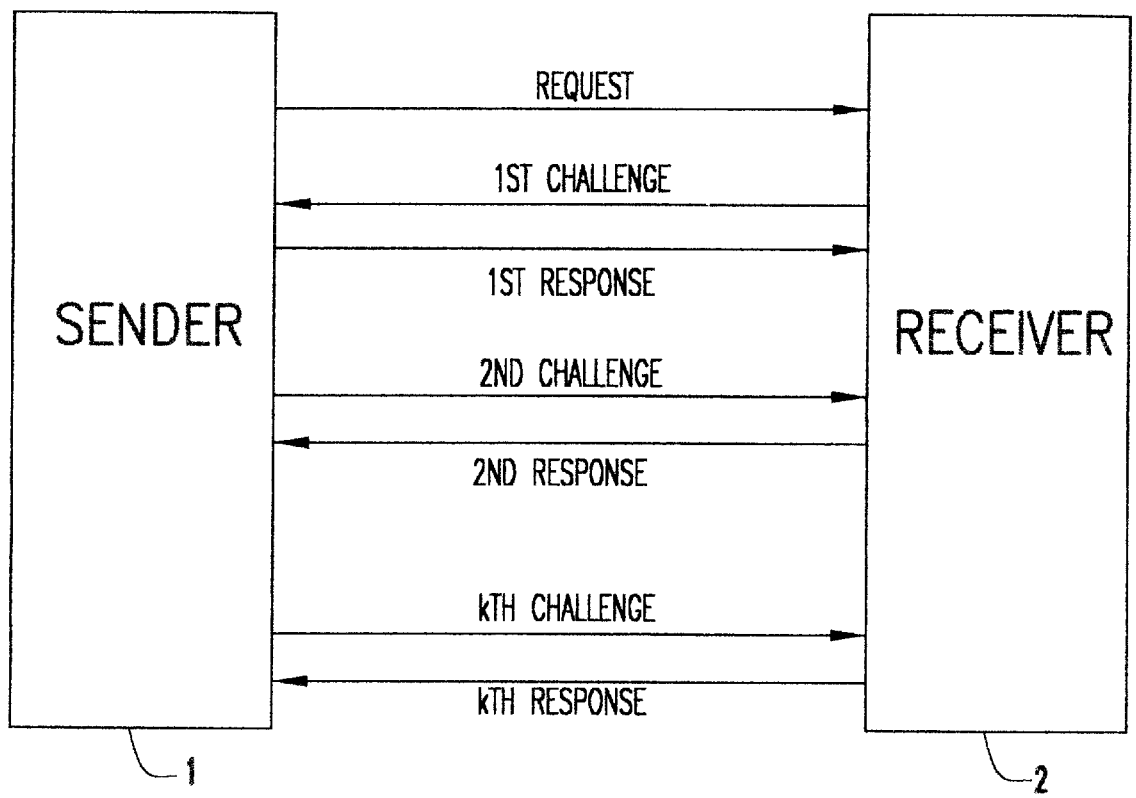
FIG. 1 is a block diagram showing the general protocol according to the invention.

Referring now to the drawings, and more particularly to FIG. 1, there is illustrated in block diagram form the protocol used to transmit data between a sender 1 and a receiver 2.

1. The sender sends the receiver a request to begin transmission.
2. Upon getting the request, the receiver responds with a challenge, illustrated in FIG. 1 as the $1^{st}$ challenge.
3. The sender receives the $1^{st}$ challenge. Then:
   A. If the bit to be transmitted is a one, he sends the correct response for the challenge received.
   B. Otherwise, he generates a random incorrect response and sends it.
4. Steps 2 and 3 are repeated k times, or as many times as there are bits left in the message.

Figure 2:
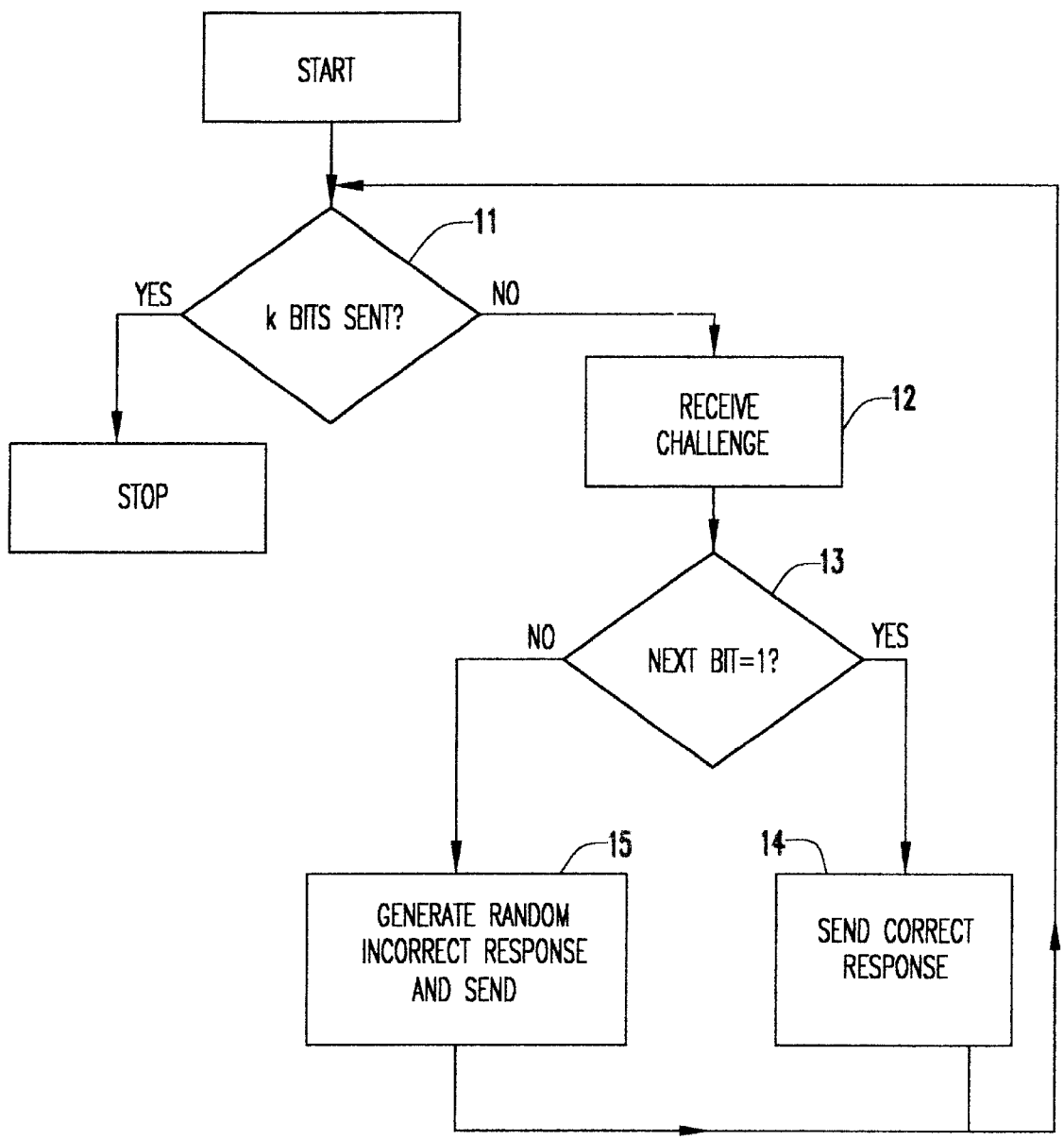
FIG. 2 is a flow diagram of the procedure implemented at the sender according to the invention.
Figure 3:
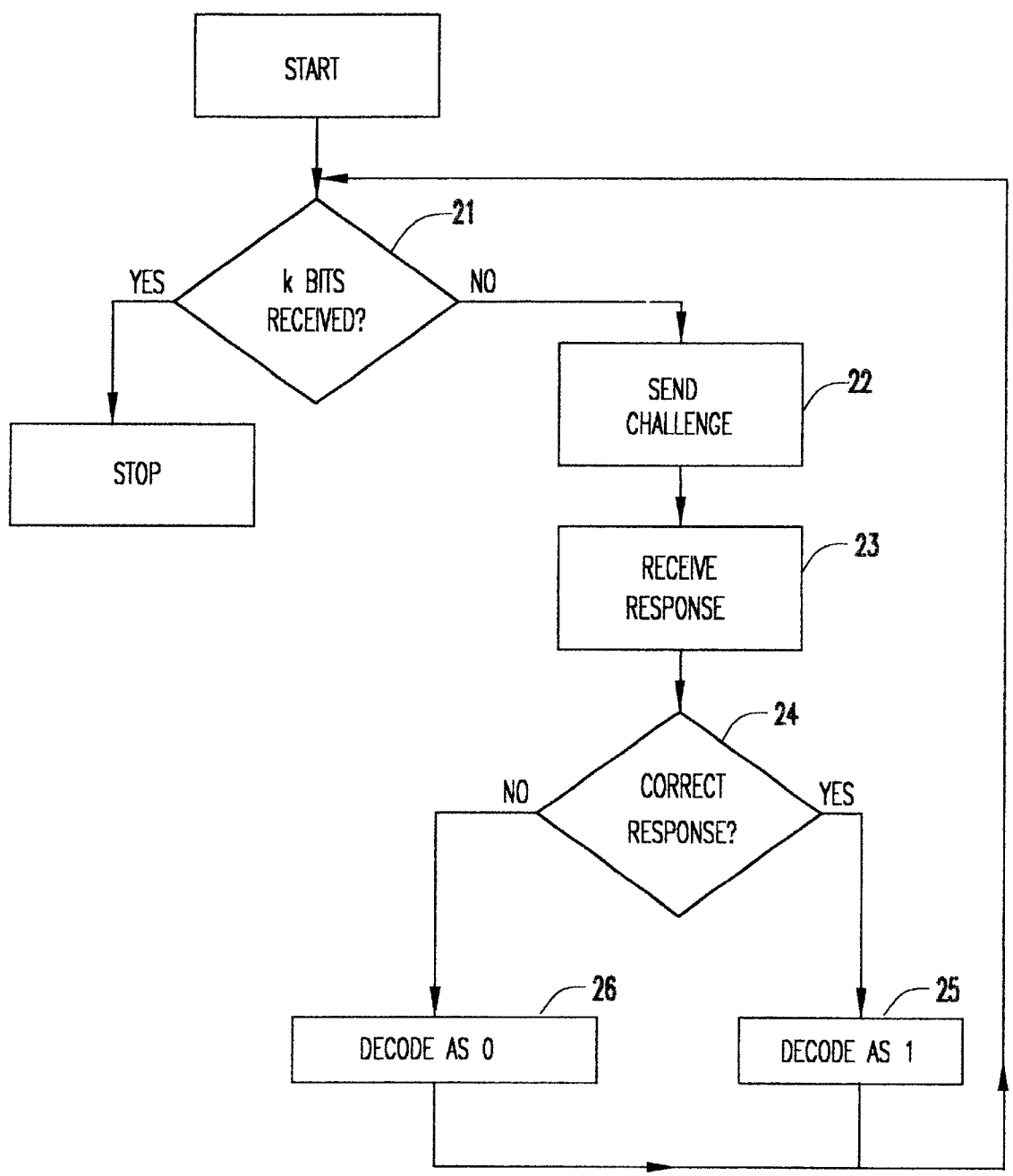
FIG. 3 is a flow diagram of the procedure implemented at the receiver according to the invention.

This protocol is illustrated in flowcharts of FIGS. 2 and 3 for the sender and receiver, respectively. The processing loop at the sender (FIG. 2) is entered at decision block 11 where a test is made to determine if all k bits of the message have been sent. If not, a challenge is received from the receiver in function block 12. The sender then determines in decision block 13 whether the next bit to be transmitted in the message has a value of a "1" or a "0". If a "1", the correct response is sent in function block 14; otherwise, a random incorrect response is generated and sent in function block 15. The process then loops back to decision block 11. When all k bits have been sent, the process stops.

At the receiver (FIG. 3), the procession loop is entered at decision block 21 where a determination is made as to whether k bits have been received. If not, a challenge is sent to the sender in function block 22, and the sender response is received in function block 23. A test is then made in decision block 24 to determine if the response received is the correct response for the challenge sent. If so, the value "1" is decoded in function block 25; otherwise, the value "0" is decoded in function bock 26. The process then loops back to decision block 21. When k bits have been received, the process ends.

A straightforward implementation of a challenge-response system can be obtained by having a table of challenges and responses, of which both the sender and receiver possess a copy. Initially, it has to be ensured that the sender and the receiver share such a table and its contents are not known to any other party. This problem is essentially the same as that of key distribution in secret-key based encryption or authentication schemes and can be solved by either physical delivery of the secret information or by using one of the various known techniques of key distribution.

The entries in a table of challenges and responses are randomly picked strings. When issuing a challenge, the receiver makes sure that the challenge has not been previously used. This limits the amount of data that can be transferred before a new table is required. Although using available technology it is possible to have a table containing say a few million entries, the limitation does imply that our method more appropriate in situations where the amount of data that is needed to be securely transferred is not very large. However, there is a large range of scenarios where that is in fact the case. Examples include the transmission of credit cart numbers or other financial information in electronic transactions and the transmission of license numbers in the sale of software products over the Internet. If our method is implemented using a table of challenges and responses described here, secure data transmission is achieved without any use of encryption, which may be particularly useful in situations where data security through encryption is not available for some technical or legal reasons.

Other implementations of the challenge-response mechanism are known and are used in various authentication schemes such as the Kerberos authentication scheme. Any such implementation can be used in our method. The basic step of our method will continue to be a successful authentication to transmit a one bit and a deliberately unsuccessful authentication for the transmission of a zero bit.

The use of such an authentication scheme will remove the limitation imposed by the size of the challenge-response table, since most such schemes impose no restriction on the number of times such a scheme may be securely employed.

Many authentication schemes based on one-time passwords involve the generation of a set of passwords from an initial secret key or password. When the set of passwords is exhausted, a new secret key may be required to generate another set. Using our method, the new secret key may itself be transmitted as a secure message.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for sending secret messages comprising a repeated use of an authentication scheme where a successful authentication implies the transmission of a bit of a first value and a deliberate unsuccessful authentication implies the transmission of a bit of a second value, whereby a secret message is transmitted as a binary string each bit of which is determined as either a successful or unsuccessful authentication.

2. The method as in claim 1, where a sender and a receiver agree upon a secret table of challenge response pairs and successful authentication is when the sender sends a correct response to a given challenge, while an unsuccessful authentication is when the sender sends any other response.

3. The method as in claim 2, where the challenge response pairs are automatically generated using a shared secret key and a pair generation algorithm.

4. The method as in claim 3, where a new secret key to generate challenge response pairs is also sent as a secret message when required.

5. The method as in claim 1, where the authentication scheme is a one time password scheme.

6. An apparatus for sending secret messages comprising a sender and a receiver, the sending responding to challenges from the receiver by sending a successful authentication to imply a bit of a first value and a deliberate unsuccessful authentication to imply a bit of a second value, whereby a secret message is transmitted as a binary string each bit of which is determined as either a successful or unsuccessful authentication.

7. The apparatus of claim 6, wherein each of the sender and receiver each include an agreed upon secret table of challenge response pairs and successful authentication is when the sender sends a correct response to a given challenge from the table of challenge response pairs and an unsuccessful authentication is when the sender sends any other response.

8. The apparatus of claim 7, wherein the challenge response pairs of the secret table are automatically generated using a shared secret key and a pair generation algorithm.

9. The apparatus of claim 8, wherein a new secret key to generate challenge response pairs is sent by the sender to the receiver as a secret message.

10. The apparatus of claim 6, wherein the authentication scheme is a one time password scheme.

\* \* \* \* \*